US011620167B2

(12) United States Patent
Gupta et al.

(10) Patent No.: US 11,620,167 B2
(45) Date of Patent: Apr. 4, 2023

(54) SYSTEM FOR ALLOCATING TASK PROCESSING BETWEEN AN IOT DEVICE AND AN EDGE DEVICE

(71) Applicant: Dell Products L. P., Round Rock, TX (US)

(72) Inventors: Shubham Gupta, Jaipur (IN); Rangan Basu, Gurgaon (IN); Rohan Sharma, Delhi (IN)

(73) Assignee: Dell Products L.P., Round Rock, TX (US)

( * ) Notice: Subject to any disclaimer, the term of this patent is extended or adjusted under 35 U.S.C. 154(b) by 404 days.

(21) Appl. No.: 16/864,181

(22) Filed: May 1, 2020

(65) Prior Publication Data

US 2021/0342198 A1 Nov. 4, 2021

(51) Int. Cl.
*G06F 9/44* (2018.01)
*G06F 9/50* (2006.01)
*G06N 3/04* (2023.01)
*G06N 3/08* (2023.01)

(52) U.S. Cl.
CPC ......... *G06F 9/5083* (2013.01); *G06N 3/0445* (2013.01); *G06N 3/08* (2013.01)

(58) Field of Classification Search
None
See application file for complete search history.

(56) References Cited

U.S. PATENT DOCUMENTS

| 11,119,825 B2 * | 9/2021 | Jalali ..................... G06F 9/5044 |
| 2019/0182333 A1 * | 6/2019 | Bartfai-Walcott .... H04L 67/125 |

FOREIGN PATENT DOCUMENTS

| CN | 110427261 A | * 11/2019 | |
| CN | 111049903 A | * 4/2020 | ........... G06N 3/0445 |

OTHER PUBLICATIONS

Gupta, Shubham et al., "System for Migrating Tasks Between Edge Devices of an IOT System"; U.S. Appl. No. 16/864,186, filed May 1, 2020; consisting of Specification, Claims, Abstract, and Drawings; 37 pages.

* cited by examiner

*Primary Examiner* — Insun Kang
(74) *Attorney, Agent, or Firm* — Krishnendu Gupta; Deepika Bhayana; Derek Lam

(57) ABSTRACT

Methods and systems are disclosed for allocating tasks between apparatus in an IoT system in a manner to generally minimize the total amount of time to execute the tasks. At least one embodiment includes a computer-implemented method for allocating task processing between an internet of things (IoT) device and an edge device. The computer-implemented method includes collecting data from one or more sensors to execute a task having data size Xt; predicting a space complexity data size Xc for the task based on data size Xt, and allocating data for processing between the IoT device and edge device as a function of Xc. In at least one embodiment, the space complexity data size Xc is determined by applying Xt to the input of a long short-term memory neural network.

18 Claims, 9 Drawing Sheets

SYSTEM FOR ALLOCATING TASK PROCESSING BETWEEN AN IOT DEVICE AND AN EDGE DEVICE

BACKGROUND OF THE INVENTION

Field of the Invention

The present disclosure generally relates to the management of tasks in an Internet of Things (IoT) system and, more particularly, to a system for allocating task processing between an IoT device and an edge device.

Description of the Related Art

As the value and use of information continue to increase, individuals and businesses seek additional ways to process and store information. One option available to users is information handling systems (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are employed with Internet of Things technology. The Internet of things (IoT) is a system of interrelated computing devices, mechanical, and digital machines provided with unique identifiers (UIDs), and have the ability to transfer data over a network without necessarily requiring human-to-human or human-to-computer interaction.

The Internet of things has evolved due to the convergence of multiple technologies, real-time analytics, machine learning, commodity sensors, and embedded systems. Traditional fields of embedded systems, wireless sensor networks, control systems, automation (including home and building automation), and others all contribute to enabling the Internet of Things. In the consumer market, IoT technology is most synonymous with products pertaining to the concept of the "smart home," covering devices and appliances (such as lighting fixtures, thermostats, home security systems and cameras, and other home appliances) that support one or more common ecosystems, and can be controlled via devices associated with that ecosystem, such as smartphones and smart speakers.

SUMMARY OF THE INVENTION

This Summary provides a simplified form of concepts that are further described below in the Detailed Description. This Summary is not intended to identify key or essential features and, therefore, should not be used for determining or limiting the scope of the claimed subject matter.

A system of one or more computers can be configured to perform particular operations or actions by virtue of having software, firmware, hardware, or a combination of them installed on the system that in operation causes or cause the system to allocate tasks between apparatus in an IoT system in a manner to generally minimize the total amount of time to execute the tasks. At least one embodiment includes a computer-implemented method for allocating task processing between an internet of things (IoT) device and an edge device. The computer-implemented method includes collecting data from one or more sensors to execute a task having data size Xt; predicting a space complexity data size Xc for the task based on data size Xt, and allocating data for processing between the IoT device and edge device as a function of Xc. In at least one embodiment, the space complexity data size Xc is determined by applying Xt to the input of a long short-term memory neural network. Other embodiments of this aspect include corresponding computer systems, apparatus, and computer programs recorded on one or more computer storage devices, each configured to perform the actions of the methods.

Another embodiment includes one or more information handling systems, where the one or more information handling systems include a processor; a data bus coupled to the processor; and a non-transitory, computer-readable storage medium embodying computer program code, the non-transitory, computer-readable storage medium being coupled to the data bus; where the computer program code included in one or more of the information handling systems is executable by the processor of the information handling system so that the information handling system, alone or in combination with other information handling systems, executes operations including: collecting data from one or more sensors in an IoT system to execute a task having data size Xt; predicting a space complexity data size Xc for the task based on data size Xt; and allocating data for processing between an IoT device and in edge device as a function of Xc. In at least one embodiment, the space complexity data size Xc is determined by applying Xt to the input of a long short-term memory neural network.

Another embodiment includes a non-transitory, computer-readable storage medium including computer-executable code configured to execute operations including collecting data from one or more sensors in an IoT system to execute a task having data size Xt; predicting a space complexity data size Xc for the task based on data size Xt, and allocating data for processing between an IoT device and in edge device as a function of Xc.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
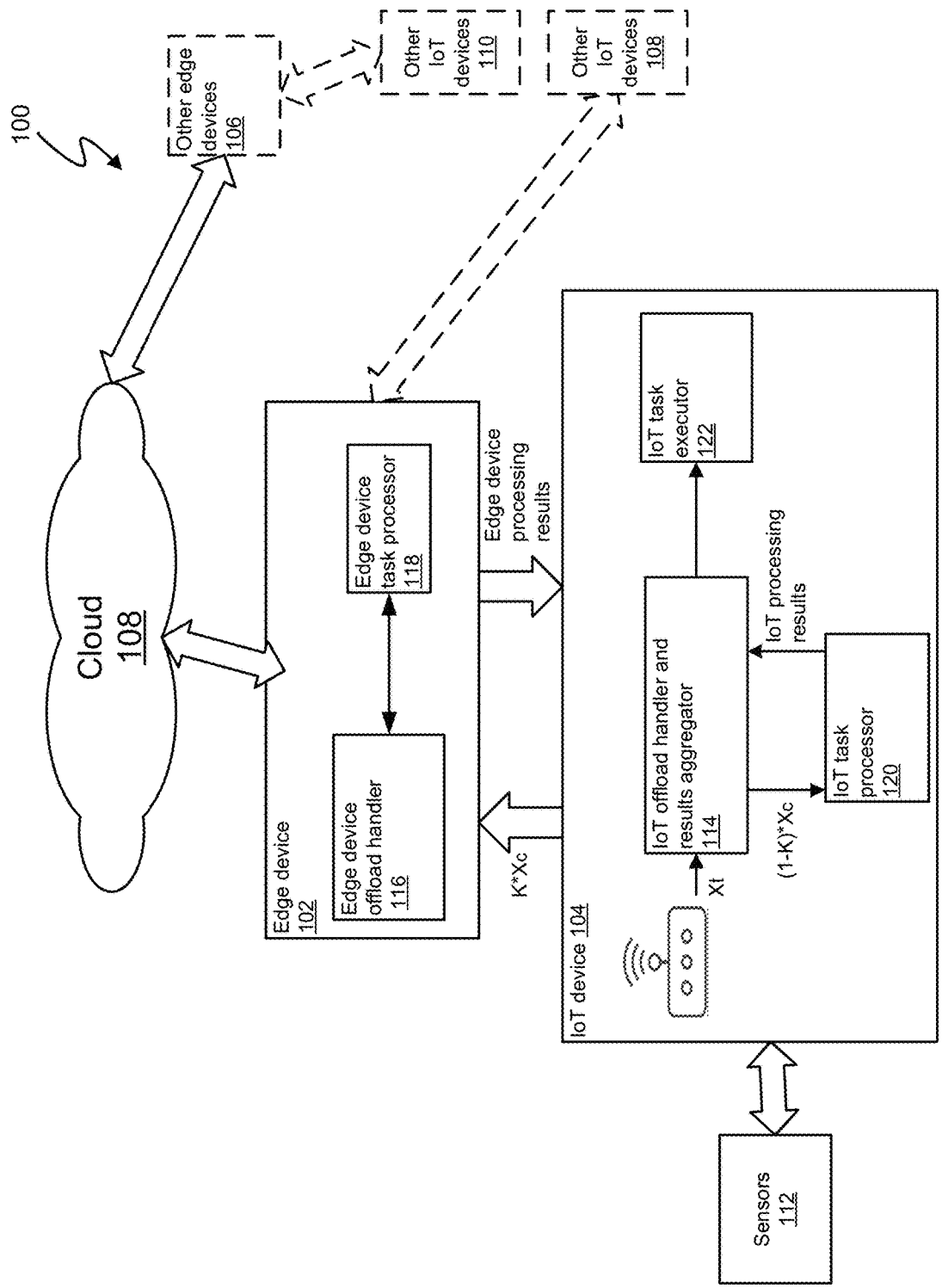
FIG. 1 depicts an electronic environment in which certain embodiments of the disclosed system may operate.

Certain aspects of the disclosed system are directed to increasing the processing efficiency of an IoT system. In an IoT system, IoT devices collect user data via sensors or inputs. The IoT devices process the data and execute local operations using the processed data. In certain systems, the IoT devices processed data and forward it to an edge device, where the processed data is subject to further processing and/or sent to a cloud server.

The data collected at an IoT device has an actual data size Xt corresponding to the amount of data that is to be processed. Tasks having large data sizes (large values of Xt) are time-consuming to process at IoT devices since IoT devices often have limited processing power. However, certain aspects of the disclosed system recognize that portions of the tasks that are to be executed by an IoT device may be offloaded to an edge device with which the IoT device communicates. Accordingly, certain aspects of the disclosed system are directed to implementing an offloading strategy that minimizes the processing time taken when data of the task is distributed between an IoT device and the edge device to which it is connected.

Edge devices within an IoT system are typically connected to receive data, processed or otherwise, from multiple IoT devices. The number of IoT devices connected to a single edge device may vary widely. For example, while one edge device may be connected to ten IoT devices, another edge device may be connected to one hundred edge devices. The edge device connected to ten IoT devices may have more computational resources available than the edge device connected to one hundred IoT devices. Certain aspects of the disclosed system take into consideration the disparity of edge node workload that may occur in an IoT system and provide a migration strategy in which the data from a task may be migrated from an edge device to another edge device.

Edge devices and IoT devices within an IoT network constitute various forms of information handling systems. An information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be an IoT device, an edge device, a personal computer (e.g., desktop or laptop), a tablet computer, a mobile device (e.g., personal digital assistant (PDA) or smartphone), a server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

FIG. 1 depicts an electronic environment 100 in which certain embodiments of the disclosed system may operate. In this example, the electronic environment 100 includes an edge device 102 configured for communication with IoT device 104. In certain embodiments, the edge device 102 is also in communication with other information handling systems, such as other edge devices 106 and/or servers, over the cloud 108 or other suitable network. In the illustrated example, the other edge devices 106 are connected to other IoT devices 110.

For purposes of the following discussion, the relative operation between edge device 102 and IoT device 104 will be the focus of describing certain embodiments of the task offloading operations. However, it will be recognized, in view of the present disclosure, that the disclosed examples may be extended to any IoT device that is connected to a corresponding edge device.

In the example shown in FIG. 1, IoT device 104 is configured to receive data for processing from one or more sensors 112. In certain embodiments, data from the sensors are in-situ with the IoT device 104 and, for example, may be hardwired with the IoT device 104. In certain embodiments, the sensors 112 may be at a remote location and accessed by the IoT device 104 over a wireless and/or wired connection.

In certain embodiments, data from the sensors 112 are provided to an IoT task offload handler and results aggregator 114. In one example, the IoT task offload handler and results aggregator 114 receives a task Tsk for processing having a data size Xt bits. Although the embodiments herein describe the data in terms of bits, it will be recognized that other arrangements of binary data may be used (e.g., bytes, kilobytes, megabytes, etc.) The IoT offload handler and results aggregator 114 in certain embodiments may be configured to predict a space complexity data size Xc for the task based on data size Xt. In the illustrated system, the IoT offload handler and results aggregator 114 is configured to offload K*Xc bits for processing from the IoT device 104 to the edge device 102, where K corresponds to an offload value that is calculated to minimize the overall processing time needed by the IoT device and edge device 102 to process the total bits needed to complete task Tsk. Certain embodiments of the edge device 102 receive K*Xc bits at an edge device task offload handler 116. The K*Xc bits in certain embodiments are passed to an edge device task processor 116 at the edge device 102. In certain embodiments, the edge device task processor 116 processes the K*Xc bits and returns the processed results to the edge device task offload handler 116, which is configured to return the processed results to the IoT device 104.

In at least one embodiment, the IoT offload handler and results aggregator 114 passes the (1−K)*Xc bits to an IoT task processor 120 for local processing. The IoT task processor 102 is configured to process the (1−K)*Xc bits and return the results to the IoT offload handler and results aggregator 114. In certain embodiments, the IoT offload handler and results aggregator 114 is configured to aggregate the edge processing results with the IoT processing results to form a substantially complete processed data set for task Tsk. In certain embodiments, the processed data set for task Tsk may be provided to an IoT task executor 122, which uses the processed data to execute one or more functions at the IoT device 104. Additionally, or in the alternative, the processed data may be uploaded to other information handling systems on the cloud 108, edge devices, or other IoT devices depending on the functions for which the IoT system 100 is designed.

Figure 2:
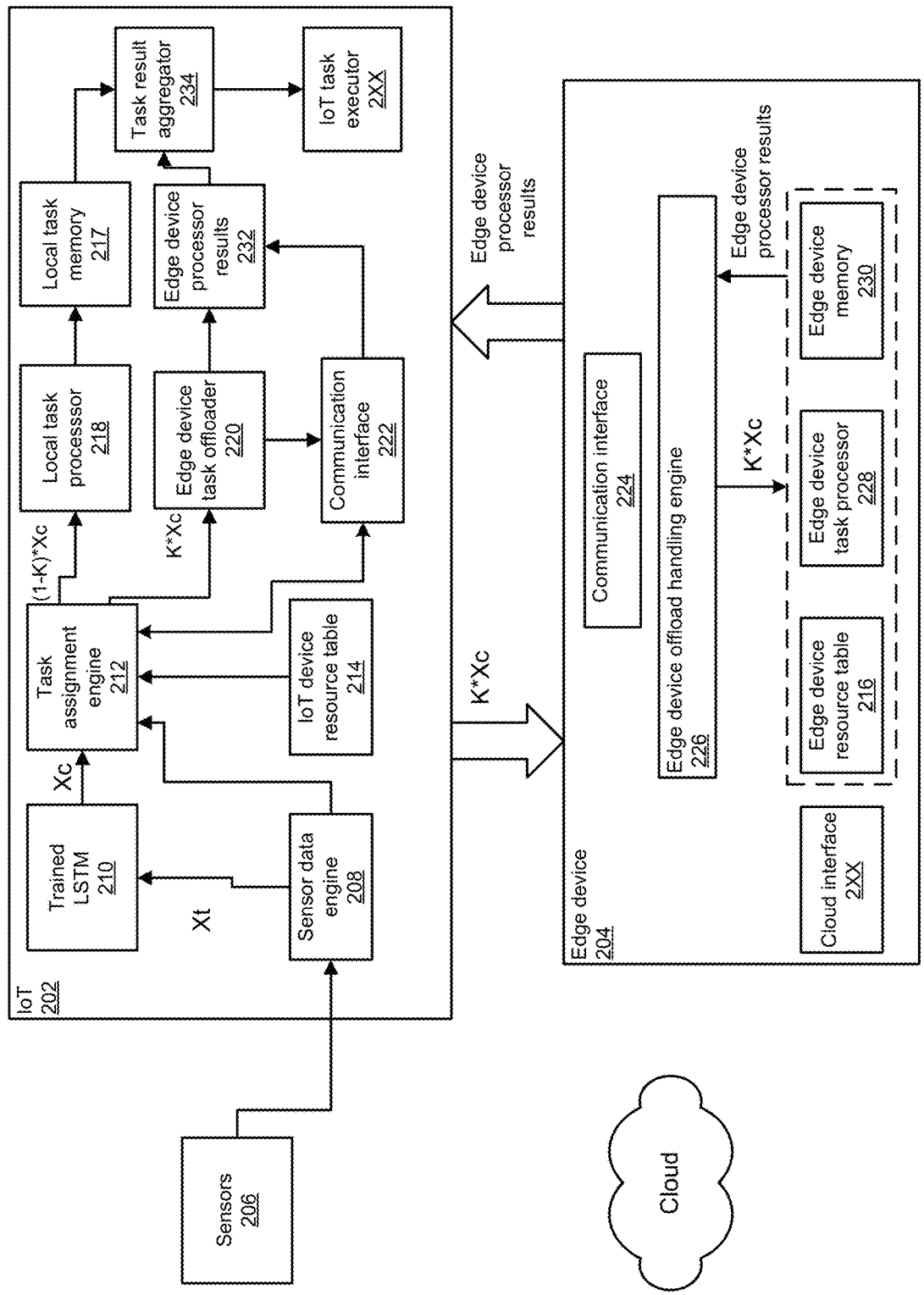
FIG. 2 depicts exemplary embodiments of an IoT device and edge device that may be employed in the disclosed system.

FIG. 2 depicts exemplary embodiments of an IoT device 202 and edge device 204 that may be employed in the disclosed system. In this example, IoT device 202 receives data from one or more sensors 206 at, for example, a sensor data engine that is configured to execute any pre-processing of the sensor data. Pre-processing operations may include, for example, an analog-to-digital conversion of the sensor data, organizing the data received from the sensors 206 in a predefined format (e.g., data table, list, etc.), and the like. In certain embodiments, the sensor data engine 208 may calculate the data size Xt of the data received from the sensors 206 for the execution of task Tsk.

In certain embodiments, the IoT device 202 applies the value of the data size Xt to a neural network 210 to predict a space complexity data size Xc for the task based on data size Xt. In the embodiment shown in FIG. 2, neural network 210 is a long short-term memory (LSTM) neural network that has been trained to predict a space complexity data size Xc based on data size Xt. In certain embodiments, neural network 210 is trained to predict a wide range of Xc values for a wide range of Xt input values to thereby facilitating the calculation of a generally optimal division of bits for processing between the IoT device 202 and the edge device 204.

Figure 3:
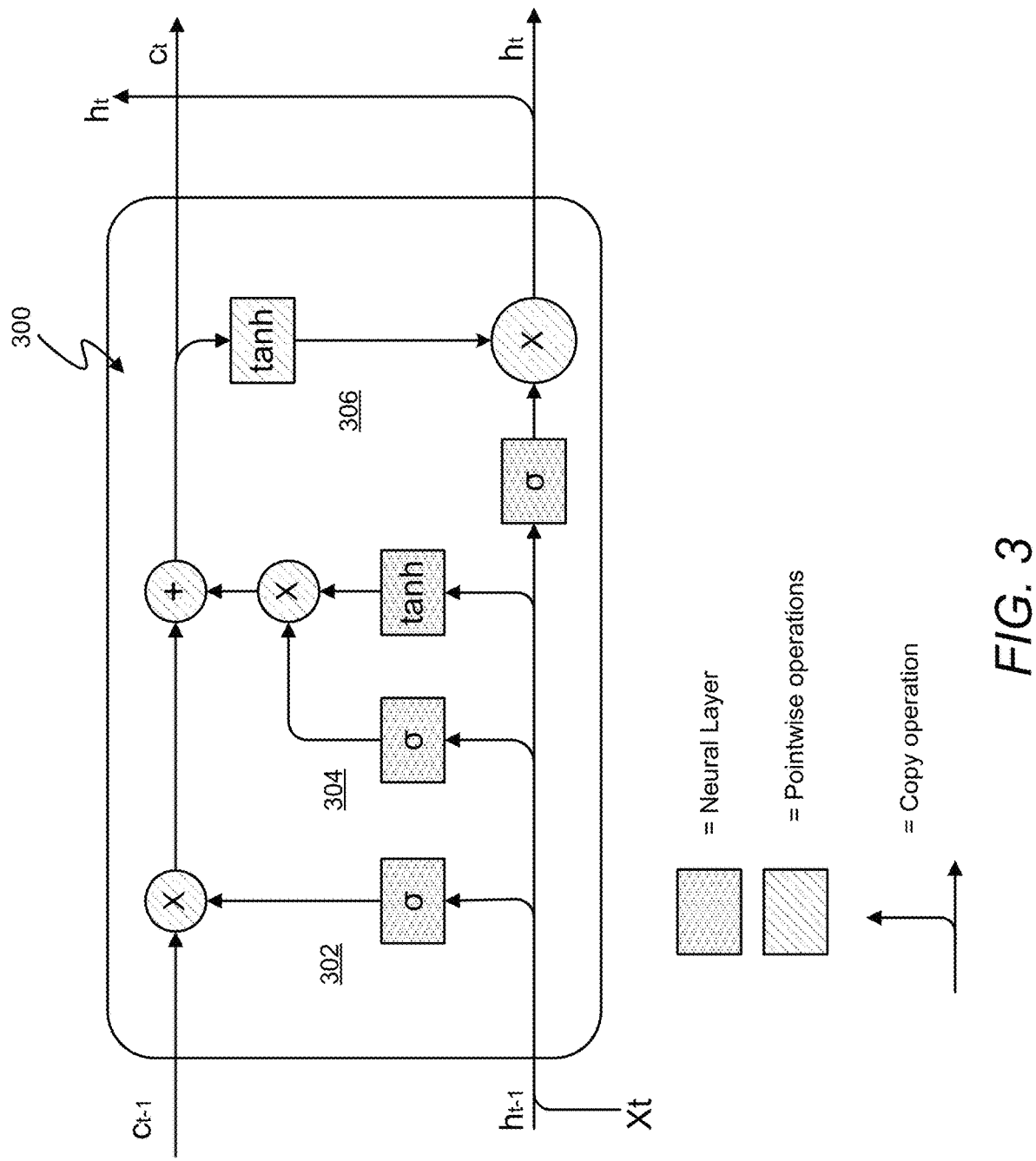
FIG. 3 illustrates one embodiment of an exemplary LSTM layer that may be used to implement a neural network used to determine space complexity data size Xc from a task data size Xt.

FIG. 3 illustrates one embodiment of an exemplary LSTM layer 300 that may be used to implement the neural network 210. Multiple LSTM layers 300 may be cascaded with one another dependent on the desired accuracy and/or long-term memory performance of the neural network 210.

The exemplary LSTM layer 300 includes a forget gate 302, input gate 304, and output gate 306 that are regulated by sigmoid functions as data sizes of Xt are provided to the LSTM layer 300 over time. In the embodiment of the LSTM layer 300 shown in FIG. 3, C(t−1) is the previous cell state and h(t−1) is the information from the previous hidden state. The output gate can be defined as: f(t)=sigmoid(h(t−1),Xt), where h(t−1) represents the information from the previous hidden layer and Xt represents the current input. The new cell state c(t)=c(t−1)*ft+sigmoid(h(t−1),Xt)*tan h((h(t−1), Xt) and the new hidden state h(t)=tan h(c(t))*sigmoid(h(t−1),Xt). In certain embodiments, the current cell state Ct may be used as the value for data size Xc. In certain embodiments, the hidden cell state ht may be used as the value for the data size Xc.

With reference again to FIG. 2, the predicted data size Xc is provided to the input of a task assignment engine 212 along with the data from the sensor data engine 208. The task assignment engine 212 in certain embodiments is configured to offload a data size K*Xc for processing by the edge device 204 while retaining data size (1−K)*Xc for local processing at the IoT device 202. In certain embodiments, the overall processing time for processing the data is minimized using the value of K, as described herein. In certain embodiments, the resources (e.g., memory) available at the IoT device 202 and edge device 204 are considered in the minimization operations. Here, the resources available on IoT device 202 are available from an IoT resource table 214, and the resources available on the edge device can be retrieved by the IoT device from an edge device resource table 216.

In certain embodiments, the task assignment engine 212 is configured to assign a group of bits having data size (1−K)*Xc for processing to a local task processor 218, which uses, for example, local task memory 217 to store the processing results of the operations executed by the local task processor 218. In certain embodiments, the group of bits having data size K*Xc is provided to an edge device task offloader 220 for communication to the edge device 204 through a communication interface 222.

In the example of FIG. 2, the edge device 204 receives the group of bits having data size K*Xc at communication interface 224 for provision to an edge device task offload handling engine 226. In certain embodiments, the edge device task offload handling engine 226 is responsible for orchestrating the receipt and transmission of data used in the task offloading operations executed at the edge device 204. As shown, the edge device task offload handling engine 226 is configured to communicate with edge device resource table 216 to communicate information regarding the resources available at the edge device to the IoT device 202 for use by the task assignment engine 212. Certain embodiments of the edge device task offload handling engine 226 are also configured to pass the data received from the IoT device 202 for processing by an edge task processor 228. In certain embodiments, the edge device task processor 228 processes the data K*Xc and stores the results in, for example, the edge device memory 230. In certain embodiments, the edge device processor results are retrieved by the edge device task offload handling engine 226 and sent through communication interface 224 to edge device processor results storage 232.

In the example shown in FIG. 2, a portion of the processed data for task Tsk is located in local task memory 212, and a further portion of the processed data for the task Tsk is located in edge device processor results memory 232. Certain embodiments of the disclosed system may include a task result aggregator 234, which aggregates the results in local task memory 217 and edge device processor results memory 232 to compile the results into a single data table, data file, data array, etc. In certain embodiments, the processing results of the local task processor 218 and edge device may be streamed to the task result aggregator 234, which may aggregate the processed data as it is received. In certain embodiments, results are made available to an IoT task executor 236, which is configured to execute local operations based on the results of processing the data for task Tsk.

Figure 4:
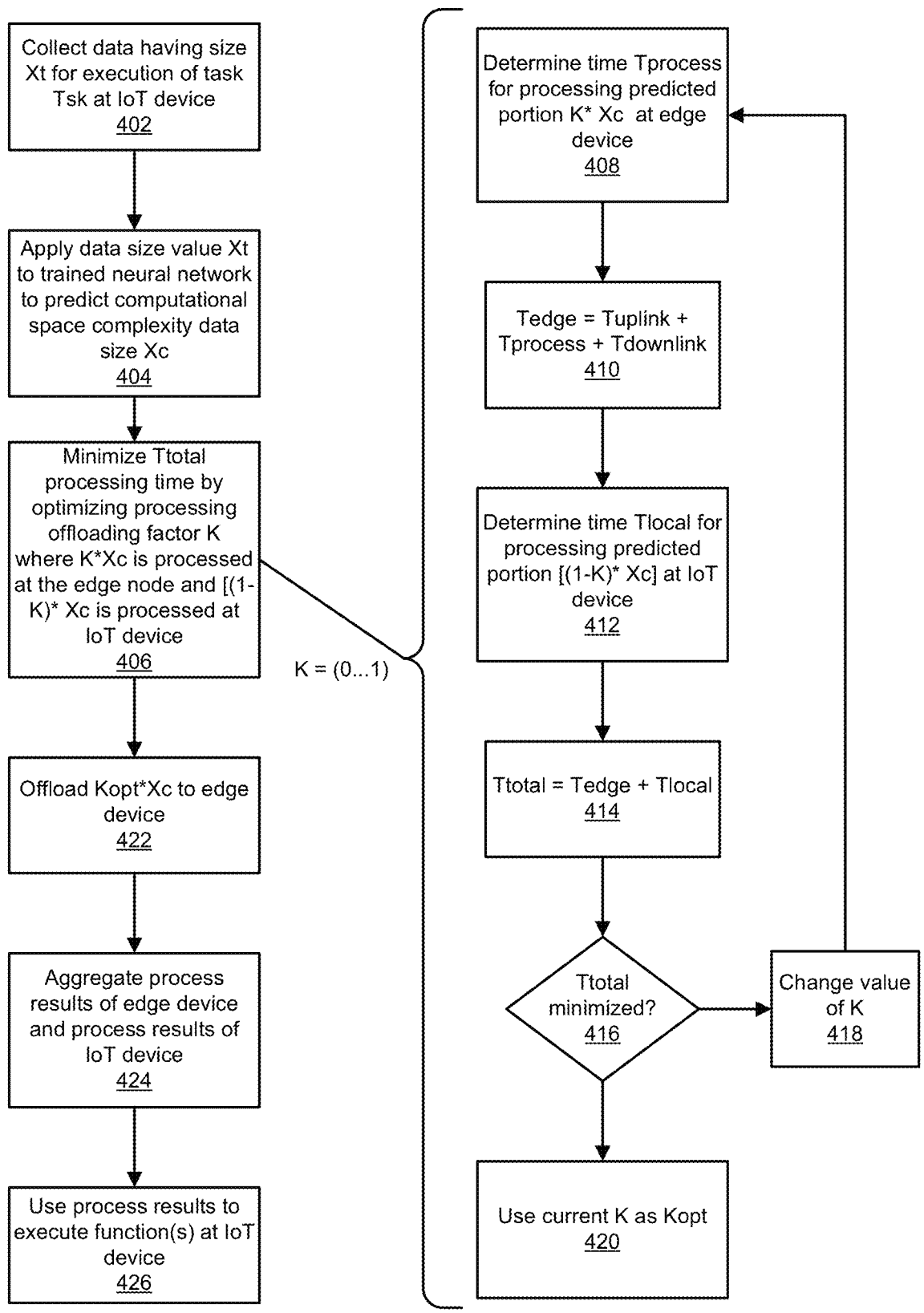
FIG. 4 is a flowchart depicting exemplary operations that may be executed in certain embodiments of the disclosed task offloading system.

FIG. 4 is a flowchart depicting exemplary operations that may be executed in certain embodiments of the disclosed task offloading system. In this example, data having size Xt is collected for the execution of a task Tsk at the IoT device at operation 402. At operation 404, the data size value Xt is applied to a trained neural network, such as a trained LSTM, to predict a computational space complexity data size Xc. At operation 406, the total processing time $T_{total}$ for executing the data locally at the IoT device and remotely at the edge device is minimized by optimizing in offloading factor K where K*Xc is processed at the edge node and (1−K)*Xc is processed locally at the IoT device.

In the specific embodiments shown in FIG. 4, the range for K is between 0 and 1, where all of the data is processed locally when K=0, and all of the data is processed at the edge node when K=1. Certain embodiments of the disclosed system are implemented with the recognition that an all or nothing approach to offloading data for processing does not frequently result less than optimal processing times as well as less than optimal use of processing resources. As such, values for K between 0 and 1 may be used to allocate data between the IoT device and edge device in a manner that minimizes the time $T_{total}$ to process all of the data for the task Tsk.

FIG. 4 shows an exemplary set of operations that may be used to minimize $T_{total}$ as a function of K. Here, a determination is made at operation 408 as to the time $T_{process}$ required to execute the predicted portion K*Xc at the edge device. As an example, $T_{process}$ may be determined in the following manner:

$$T_{process}=K*Xc*C_{ed}/F_{ed}$$

Where
$C_{ed}$=the number of cycles that the edge device will allocate to the processing of the data size K*Xc; and
$F_{ed}$=the clock frequency of the edge device.
In certain embodiments, the values of $C_{ed}$ and $F_{ed}$ may be provided to the IoT device from the edge device resource table edge device.

The total time associated with offloading and processing data at the edge device can be expressed as $T_{edge}$, where $T_{edge}=T_{uplink}+T_{process}+T_{downlink}$, which is determined at operation 410. $T_{uplink}$ and $T_{downlink}$ correspond to the time required to send the data from the IoT device to the edge device and the time required to return data from the edge device to the IoT device, respectively.

At operation 412, the time $T_{local}$ for processing predicted portion (1−K)*Xc locally at the IoT device is determined. In certain embodiments, $T_{local}$ may be determined in the following manner:

$$T_{local}=K*Xc*C_{local}/F_{local}$$

Where
$C_{local}$=the number of processing cycles that the IoT device will allocate to the processing of the data size (1−K)*Xc; and
$F_{local}$=the clock frequency of the IoT device.
The total time $T_{total}$ for processing data size Xc at the IoT device and edge device is determined at operation 414 as $T_{total}=T_{edge}+T_{local}$. At operation 416, the value of $T_{total}$ for the current value of K is compared to the value of $T_{total}$ for other values of K to arrive at a value $K_{opt}$ at which the minimum value of $T_{total}$ occurs. The values used for K may be incremented and/or decremented at operation 418 until the value of K at which $T_{total}$ is minimized occurs. Various manners of varying K to arrive at $K_{opt}$ may be used to reduce the amount of time required to reach $K_{opt}$. It will be recognized that the time $T_{total}$ that is determined in this manner is not necessarily the absolute minimum $T_{total}$. Rather, one exemplary objective is to minimize $T_{total}$ so that it is less than the time $T_{local}$ taken for executing all Xc locally.

Once the value of $K_{opt}$ is determined, value $K_{opt}$ is used to offload data size $K_{opt}$*Xc to the edge device at operation 422. At operation 424, certain embodiments aggregate the process results of the edge device and process results of the IoT device as a single process result for the task Tsk. In certain embodiments, the aggregated process results may be used to execute one or more functions at the IoT device.

Certain embodiments of the disclosed system are implemented with an understanding that edge devices within an IoT system may experience different levels of workload. As an example, an edge device servicing a large number of IoT devices may experience a high level of workload, while an edge device servicing fewer IoT devices may experience a lower level of workload. As another example, an edge device configured to handle a substantial number of tasks from a few IoT devices may be less taxed than an edge device handling a larger number of IoT devices that each implement fewer tasks. Accordingly, certain embodiments of the disclosed system are implemented to execute task migration operations that can be used to migrate task data from an edge device operating close to an overload or other high use condition to an edge device operating at a lower use condition.

Figure 5:
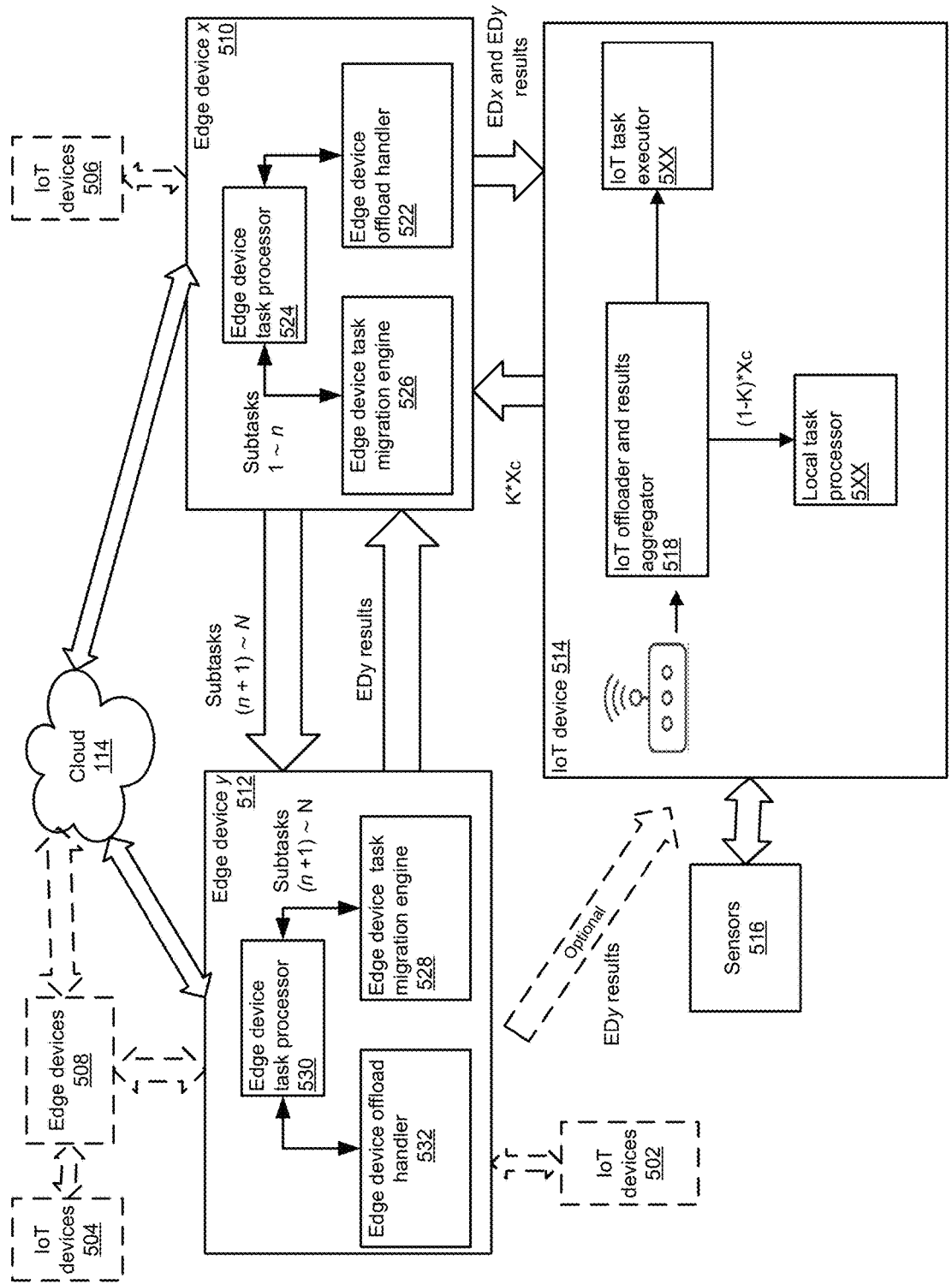
FIG. 5 shows an example of an electronic environment in which task migration operations between edge devices of an IoT system may be executed.

FIG. 5 shows an example of an electronic environment 500 in which task migration operations between edge devices of an IoT system may be executed. Although the electronic environment 500 includes IoT devices 502, 504, and 506 and edge devices 508, the following discussion will reference Edge Device x 510, Edge Device y 512, and IoT device 514 to describe certain embodiments of task migration operations executed in certain embodiments of the disclosed system.

In this example, IoT device 514 receives data of data size Xt from one or more sensors to execute a task Tsk. Certain embodiments of the IoT device 514 employ an IoT offload engine and results aggregator 518 that is configured to execute data of size (1−K)*Xc at local task processor 520 and offloads data of size K*Xc to Edge Device x 510, where it is handled by edge device task offload handling engine 522 and processed by the Edge Device x processor 524.

In certain embodiments, Edge Device x 510 may begin to experience a data overload or otherwise high resource allocation operations. To handle such situations, certain embodiments of the Edge Device x 510 may include an edge device task migration engine 526, which is configured to migrate subtasks from Edge Device x 510 to Edge Device y 512. In the illustrated example, the edge device task migration engine 526 is configured to divide a task of size N into a plurality of equal size subtasks n. In certain embodiments, the edge device task migration engine 526 divides the subtasks such that subtasks 1 through n are sent provided to the edge device task processor 524 for execution, and subtasks (n+1) through N are passed through edge device task migration engine 528 for execution by the edge device task processor 528 at Edge Device y 512. In certain embodiments, the results EDy of the data processed at edge device task processor 528 are returned to Edge Device x. Additionally, or in the alternative, the results EDy may be sent from Edge Device y to the IoT device 514.

In certain embodiments, multiple edge devices may be configured with respective edge device offload handling engines. In the example shown in FIG. 5, Edge Device y includes an edge device offload handling engine 532 that is configured to handle task offloading from one or more of the IoT devices 502.

Figure 6:
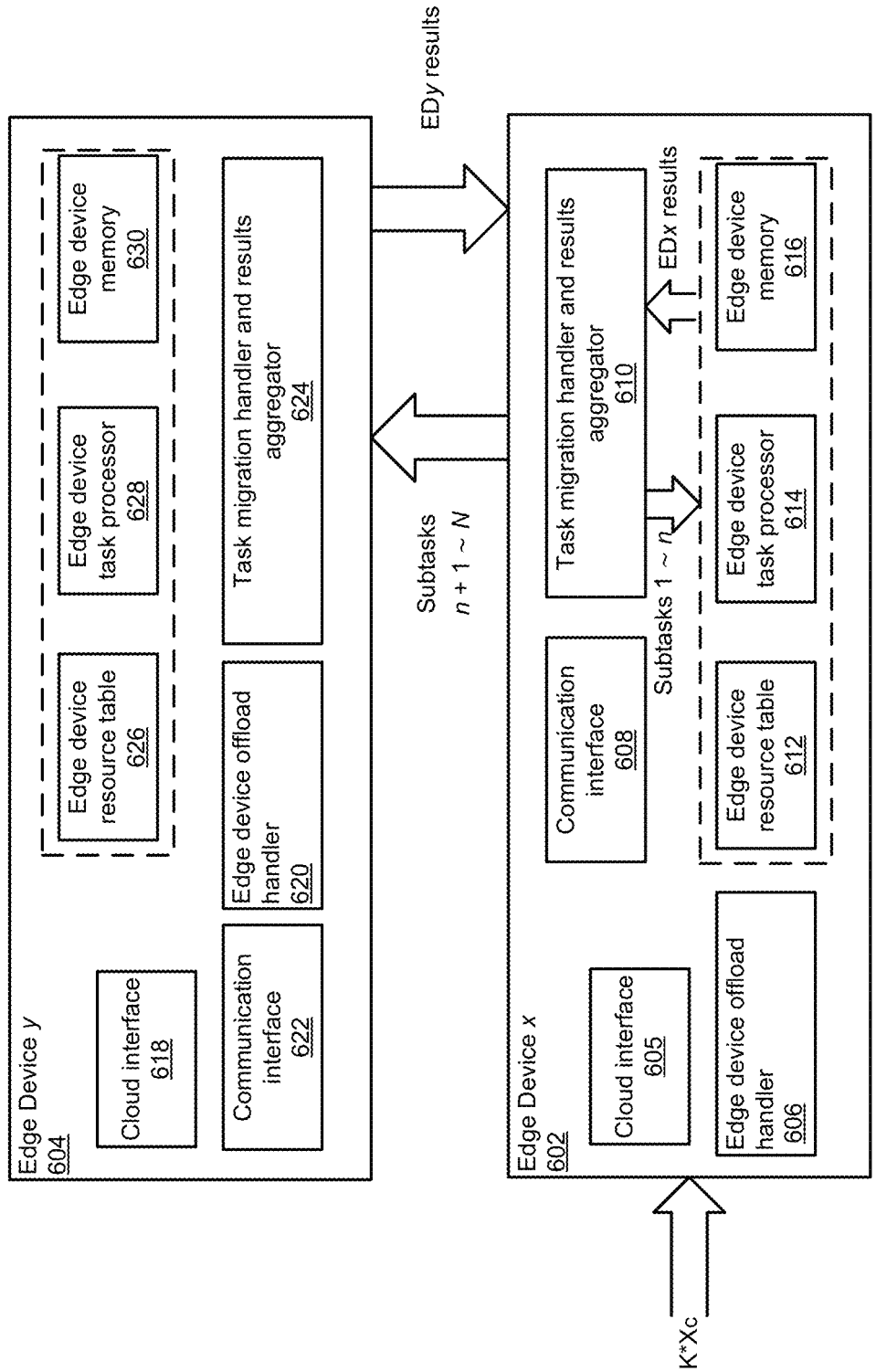
FIG. 6 depicts examples of edge device architectures that may be employed in task migration operations that may be certain embodiments of the disclosed system.

FIG. 6 depicts examples of edge device architectures that may be employed in task migration operations that may be certain embodiments of the disclosed system. The example illustrated in FIG. 6 uses two edge devices, Edge Device x 602 and Edge Device y 604, to explain exemplary task migration structures and operations. However, the principles of task migration may be extended to multiple edge devices.

In certain embodiments, the edge devices are connected with one another over a common local network. In certain embodiments, the edge devices are connected with one another over the Internet/cloud.

In certain embodiments of the disclosed system, Edge Device x 602 and Edge Device y 604 have similar architectures. Here, Edge Device x 602 includes a cloud interface 605, an edge device offload handler 606, a communication interface 608, and a task migration handler and results aggregator 610. Edge device x 602 in the illustrated embodiment also includes an edge device resource table 612, an edge device task processor 614, and edge device memory 616. Similarly, Edge Device y 604 includes a cloud interface 618, an edge device offload handler 620, a communication interface 622, and a task migration handler and results aggregator 624. Edge device y 604 in the illustrated embodiment also includes an edge device resource table 626, an edge device task processor 628, and edge device memory 630.

In certain embodiments, task migration handler and results aggregators 610 and 624 are configured to handle task migration from Edge Device x 602 to Edge Device y 604, receive the processed results EDy from Edge Device y 604 and aggregate the results of the processed results of the Edge Device x 602 and Edge Device y 604 at task migration handler results aggregator 610.

In FIG. 6, Edge Device x 602 receives a task B, which in this example is received from an IoT device and has a data size K*Xc. The data size K*Xc may be assigned from the IoT device to the Edge Device x 602 in the manner described herein. Additionally, or in the alternative, task B may correspond to any task having a data size N including data size K*Xc. In certain embodiments, the task migration handler and results aggregator 610 detects the resource utilization of the Edge Device x 602 using, for example, the edge device resource table 612. If the resource utilization at Edge Device x reaches an overload and/or high use condition warranting migration of subtasks as set by, for example, a threshold, the task migration handler and results aggregator 610 may initiate task migration operations.

When certain embodiments of the task migration handler and results aggregator 610 determine that a task migration to Edge Device y 604 is warranted, the task migration handler and results aggregator 610 undertakes operations to divide the data to minimize the overall time $T'_{(total)}$ to process the data at Edge Device x 602 and Edge Device y 604.

As explained in further detail herein, the task migration handler and results aggregator 610 is configured to divide the task of data size N into equal subtasks of data size n. Task migration handler and results aggregator 610 migrates subtasks n+1 through N for execution by the edge device task processor 628 at Edge Device y 604. Similarly, the task migration handler and results aggregator 610 passes subtasks 1 through n for execution at the edge device task processor 614 of Edge Device x 602. During the time minimization operations, certain embodiments minimize the total time $T'_{(total)}$ for processing by optimizing the value of n.

Figure 7:
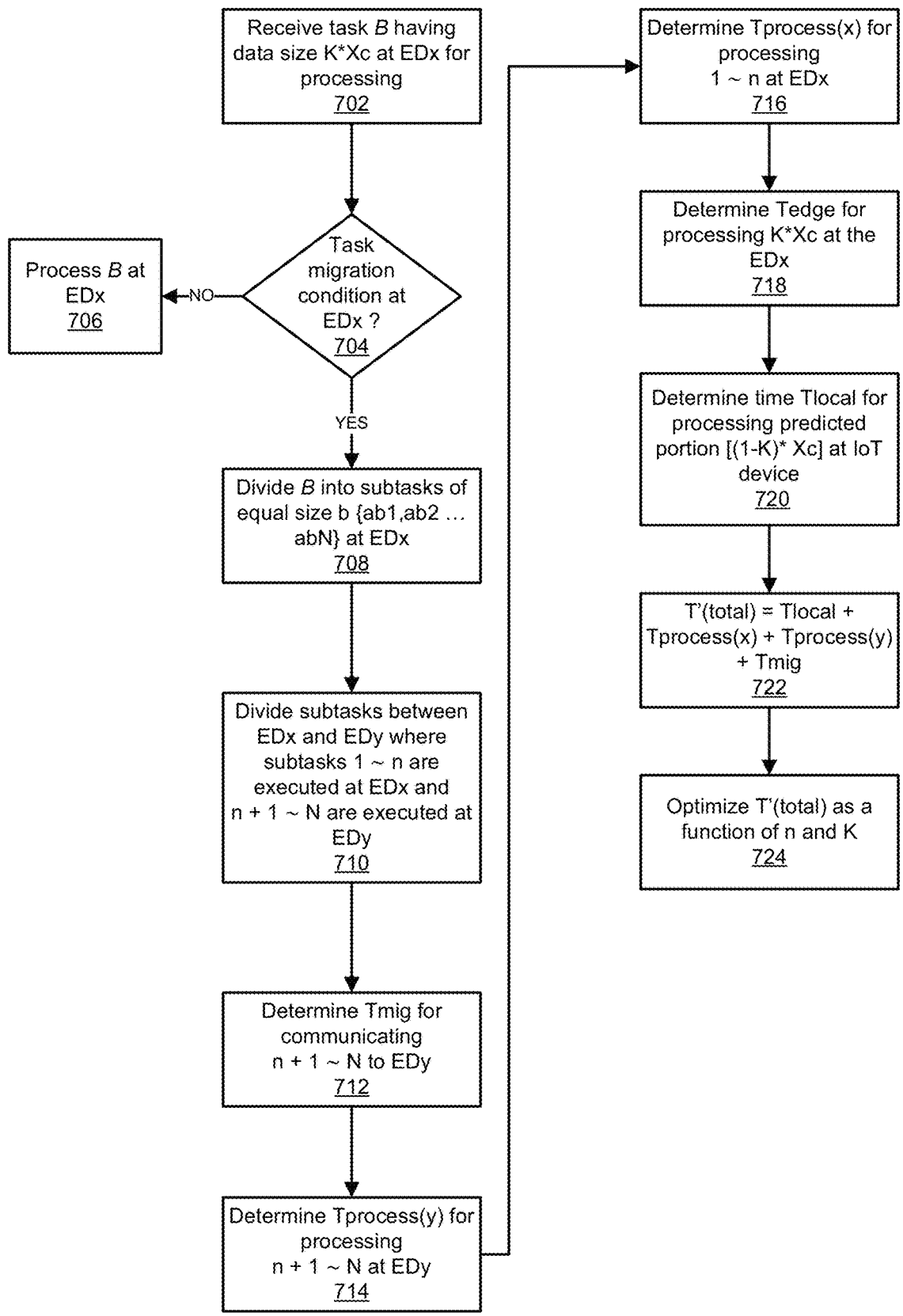
FIG. 7 is a flowchart depicting exemplary operations that may be executed when $T_{(total)}$ is minimized as a function of K and n.

FIG. 7 is a flowchart depicting exemplary operations that may be executed when $T'_{(total)}$ is minimized as a function of K and n. In this example, a task having data size B=K*Xc is received for processing at operation 702. At operation 704, a determination is made as to whether a task migration condition exists at the Edge Device x given K*Xc. If a task migration condition does not exist, only the IoT device and Edge Device x undertake a processing time minimization operation to arrive at $K_{opt}$. However, if a task migration condition exists at operation 704, the task of data size B is divided into N subtasks of equal size b {ab1, ab2 ... abN} and operation 708. At operation 710, division of the subtasks is undertaken such that subtasks 1 through n are designated for execution at Edge Device x and subtasks n+1 through N are designated for execution at Edge Device y.

In certain embodiments, minimization of $T'_{(total)}$ takes into consideration the time for communicating the subtasks of data size n+1 through N from Edge Device x to Edge Device y. The time for communicating the subtasks n+1 through N to Edge Device x to Edge Device y may be determined at operation 712 and expressed as:

$$Tmig = \frac{\sum_{n=1}^{N} abn}{R}$$

where R=maximum uplink transfer rate.

In certain embodiments, the time for processing the subtasks at each of the Edge devices is calculated using, for example, the number of processing cycles that each of the edge devices will assign to processing their respective subtasks, the operating frequency of each of the edge devices, and, in some instances, other factors including available resources such as the availability of memory. To this end, the time $T_{process(y)}$ for processing n+1 through N subtasks at Edge Device y is determined at operation 714, and the time $T_{process(x)}$ for processing 1 through n subtasks at Edge Device x is determined at operation 716. Certain embodiments determine the time $T_{edge}$ f predicted portion or processing predicted K*Xc at Edge Device x at operation 718 and the time $T_{local}$ for processing predicted portion [(1−K)*Xc] is calculated at operation 720. At operation 722, the total processing time $T'_{(total)}$ is determined as:

$$T'_{(total)} = T_{local} + T_{process(x)} + T_{process(y)} + T_{mig}$$

At operation 724, T'(total) is minimized as a function of n and K. A variety of multidimensional minimization algorithms may be selected for use at operation 724 including, for example, calculations of $T'_{(total)}$ using predetermined sequences for the values of K and n until $T'_{(total)}$ is minimized. It will be recognized that the time $T'_{(total)}$ that is determined in this manner is not necessarily the absolute minimum $T'_{(total)}$.

Figure 8:
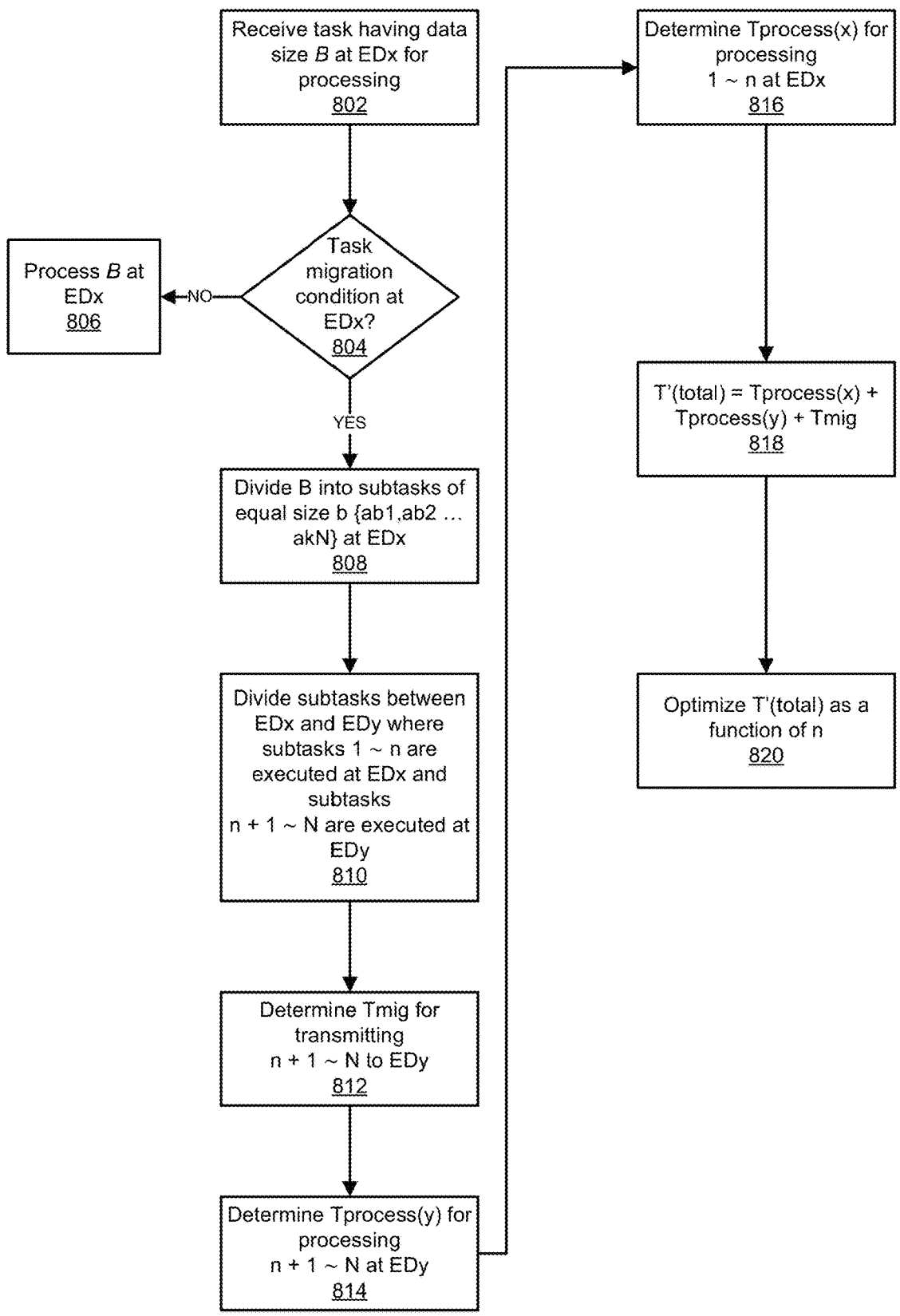
FIG. 8 is a flowchart depicting exemplary operations that may be executed when $T_{(total)}$ is minimized as a function of n without reference to predicted data size Xc.

FIG. 8 is a flowchart depicting exemplary operations that may be executed when $T'_{(total)}$ is minimized as a function of n without reference to predicted data size Xc. In this example, a task having data size B is received for processing at operation 802. At operation 804, a determination is made as to whether a task migration condition exists at the Edge Device x given B. If a task migration condition does not exist, the Edge Device x executes the task B. However, if a task migration condition exists at operation 804, the task of data size B is divided into N subtasks of equal size b {ab1, ab2 ... abN} at operation 808. At operation 810, processing of the subtasks is divided such that subtasks 1 through n are designated for execution at Edge Device x and subtasks n+1 through N are designated for execution at Edge Device y.

In certain embodiments, minimization of $T'_{(total)}$ takes into consideration the time for communicating the subtasks of data size n+1 through N from Edge Device x to Edge Device y. The time for communicating the subtasks n+1 through N to the Edge Device x to Edge Device y may be determined at operation 812 and expressed as:

$$Tmig = \frac{\sum_{n=1}^{N} abn}{R}$$

where R=maximum uplink transfer rate.

In certain embodiments, the time for processing the subtasks at each of the Edge devices is calculated using, for example, the number of processing cycles that each of the edge devices will assign to processing their respective subtasks, the operating frequency of each of the edge devices, and, in some instances, other factors including available resources such as the availability of memory. To this end, the time $T_{process(y)}$ for processing n+1 through N subtasks at Edge Device y is determined at operation 814, and the time $T_{process}(x)$ for processing 1 through n subtasks at Edge Device x is determined at operation 816. At operation 818, the total processing time $T'_{(total)}$ is determined at operation 818 as:

$$T'_{(total)} = T_{local} + T_{process}(x) + T_{process(y)} + T_{mig}$$

At operation 820, $T'_{(total)}$ is minimized as a function of n. A variety of function minimization calculation algorithms may be selected for use at operation 818, including, for example, a calculation of $T'_{(total)}$ using a predetermined sequence of values for n until T' (total) is minimized.

Figure 9:
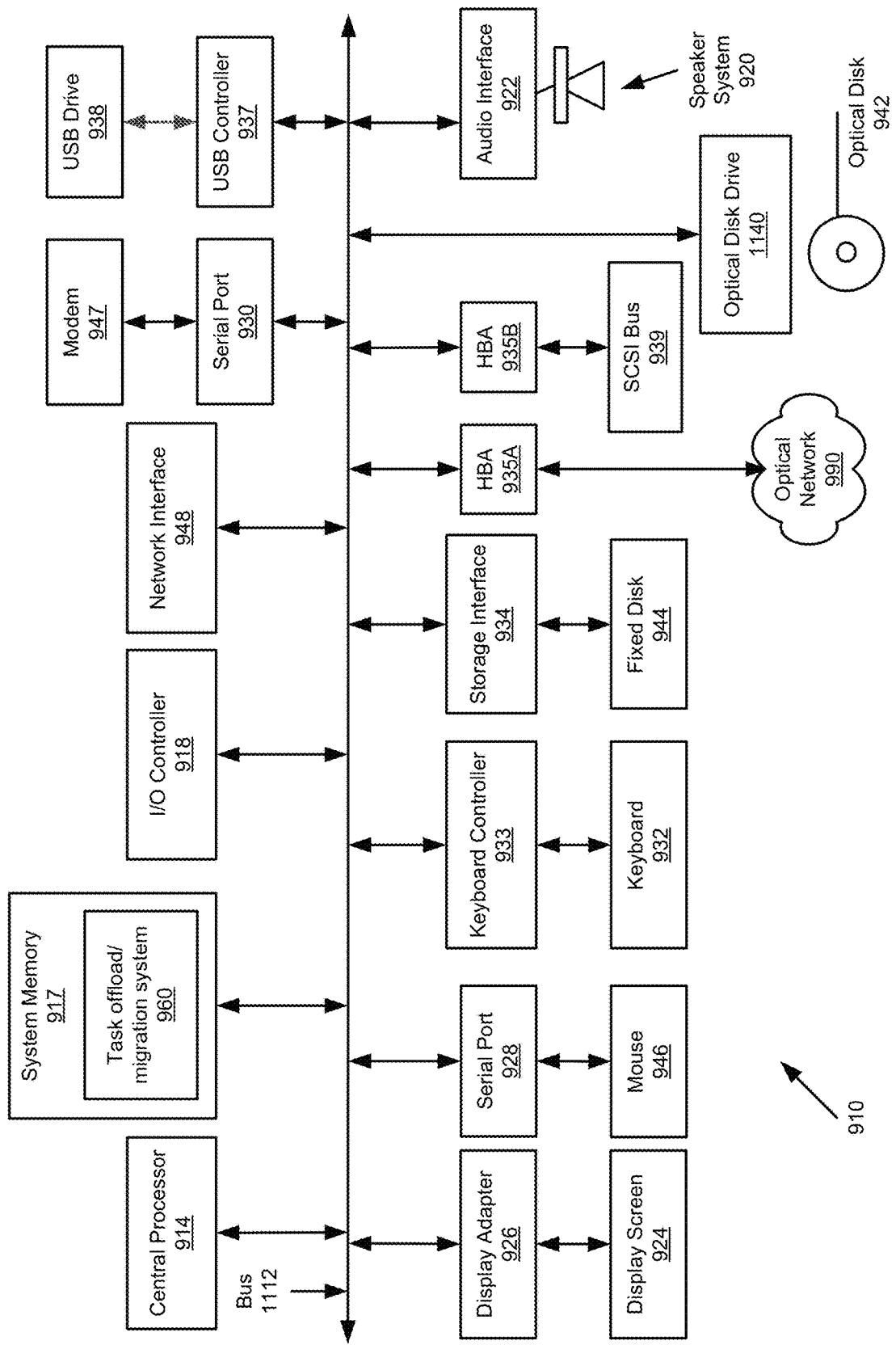
FIG. 9 depicts a block diagram of a computer system suitable for implementing aspects of the disclosed systems.

FIG. 9 depicts a block diagram of a computer system 910 suitable for implementing aspects of the systems described herein, and so can be viewed as an example of a computing device supporting a task offload/migration system 960. Computer system 910 includes a bus 912 which interconnects major subsystems of computer system 910, such as a central processor 914, a system memory 917 (typically RAM, but which may also include ROM, flash RAM, or the like), an input/output controller 918, an external audio device, such as a speaker system 920 via an audio output interface 922, an external device, such as a display screen 924 via display adapter 926, serial ports 928 and 930, a keyboard 932 (interfaced with a keyboard controller 933), a storage interface 934, a USB controller 937 operative to receive a USB drive 938, a host bus adapter (HBA) interface card 935A operative to connect with an optical network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912).

Bus 912 allows data communication between central processor 914 and system memory 917, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 910 are generally stored on and accessed from a computer-readable storage medium, such as a hard disk drive (e.g., fixed disk 944), an optical drive (e.g., optical drive 940), a universal serial bus (USB) controller 937, or other local or remote computer-readable storage medium.

Storage interface 934, as with the other storage interfaces of computer system 910, can connect to a standard computer-readable medium for storage and/or retrieval of information, such as a fixed disk drive 944. Fixed disk drive 944 may be a part of computer system 910 or may be separate and accessed through other interface systems. Modem 947 may provide a direct connection to a remote server via a telephone link or to the Internet via an internet service provider (ISP). Network interface 948 may provide a direct connection to a remote server via a direct network link to the Internet via a POP (point of presence). Network interface in 1948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras, and so on). Conversely, all of the devices shown in FIG. 9 need not be present to practice the systems described herein. The devices and subsystems can be interconnected in different ways from that shown in FIG. 9. The operation of a computer system such as that shown in FIG. 9 is readily known in the art and is not discussed in detail in this application. Code to implement portions of the systems described herein can be stored in computer-readable storage media such as one or more of system memory 917, fixed disk 914, optical disk 942, or floppy disk. The operating system provided on computer system 910 may be WINDOWS, UNIX, LINUX, IOS, or other operating system. To this end, system memory 917 is depicted in FIG. 9 as storing code implementing a task offload/migration system 960 in the manner discussed herein.

Regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

In light of the foregoing, it will be appreciated that the foregoing descriptions are intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computer-implemented method for allocating task processing between an Internet of Things (IoT) device and an edge device, comprising:
   collecting data from one or more sensors to execute a task having data size Xt;
   predicting a space complexity data size Xc for the task based on the data size Xt;
   allocating data for processing between the IoT device and edge device as a function of Xc;
   determining a time Tprocess for processing data of size K*Xc at the edge device;
   determining a time Tlocal for processing data of size [(1−K)*Xc] at the IoT device;
   minimizing Ttotal as a function of K, where Ttotal=Tprocess+Tlocal;
   communicating data having data size Kopt*Xc from the IoT device to the edge device for execution at the edge device, where Kopt is a value of K selected to minimize Ttotal; and
   executing data having data size [(1−K)*Xc] at the IoT device.

2. The computer-implemented method of claim 1, wherein
   the space complexity data size Xc is determined by applying the data size Xt to an input of a trained long short-term memory neural network.

3. The computer-implemented method of claim 1, further comprising:
   determining a resource availability A corresponding to availability of resources at the IoT device;
   determining a resource availability B corresponding to availability of the resources at the edge device; and
   using resource availabilities A and B in the minimization of Ttotal.

4. The computer-implemented method of claim 1, wherein
   the space complexity data size Xc is determined by applying the data size Xt to an input of a trained long short-term memory neural network.

5. The computer-implemented method of claim 1, further comprising:
   receiving a first set of processing results from the edge device at the IoT device;
   executing data having data size [(1−K)*Xc] at the IoT device to produce a second set of processing results; and
   aggregating the first and second set of processing results to generate a composite set of processing results.

6. The computer-implemented method of claim 5, further comprising:
   using the composite set of processing results to execute a task at the IoT device.

7. A system comprising:
   one or more information handling systems, wherein the one or more information handling systems include:
      a processor;
      a data bus coupled to the processor; and
      a non-transitory, computer-readable storage medium embodying computer program code, the non-transitory, computer-readable storage medium being coupled to the data bus;
      wherein the computer program code included in one or more of the information handling systems is executable by the processor of the information handling system so that the information handling system, alone or in combination with other information handling systems, executes operations comprising:
         collecting data from one or more sensors in an IoT system to execute a task having data size Xt;
         predicting a space complexity data size Xc for the task based on the data size Xt;
         allocating data for processing between an IoT device and an edge device as a function of Xc;
         determining a time Tprocess for processing data of size K*Xc at the edge device;
         determining a time Tlocal for processing data of size [(1−K)*Xc] at the IoT device;
         minimizing Ttotal as a function of K, where Ttotal=Tprocess+Tlocal;
         communicating data having data size Kopt*Xc from the IoT device to the edge device for execution at the edge device, where Kopt is a value of K selected to minimize Ttotal; and
         executing data having data size [(1−K)*Xc] at the IoT device.

8. The system of claim 7, wherein
   the space complexity data size Xc is determined by applying the data size Xt to an input of a trained long short-term memory neural network.

9. The system of claim 7, wherein the instructions are further configured for:
   determining a resource availability A corresponding to availability of resources at the IoT device;
   determining a resource availability B corresponding to availability of resources at the edge device; and
   using resource availabilities A and B in the minimization of Ttotal.

10. The system of claim 7, wherein
the space complexity data size Xc is determined by applying the data size Xt to an input of a trained long short-term memory neural network.

11. The system of claim 7, wherein the instructions are further configured for:
receiving a first set of processing results from the edge device at the IoT device;
executing data having data size [(1−K)*Xc] at the IoT device to produce a second set of processing results; and
aggregating the first and second set of processing results to generate a composite set of processing results.

12. The system of claim 11, wherein the instructions are further configured for:
using the composite set of processing results to execute a task at the IoT device.

13. A non-transitory, computer-readable storage medium embodying computer program code, the computer program code comprising computer executable instructions configured for:
collecting data from one or more sensors in an IoT system to execute a task having data size Xt;
predicting a space complexity data size Xc for the task based on the data size Xt;
allocating data for processing between an IoT device and an edge device as a function of Xc;
determining a time Tprocess for processing data of size K*Xc at the edge device;
determining a time Tlocal for processing data of size [(1−K)*Xc] at the IoT device;
minimizing Ttotal as a function of K, where Ttotal=Tprocess+Tlocal;
communicating data having data size Kopt*Xc from the IoT device to the edge device for execution at the edge device, where Kopt is a value of K selected to minimize Ttotal; and
executing data having data size [(1−K)*Xc] at the IoT device.

14. The non-transitory, computer-readable storage medium of claim 13, wherein
the space complexity data size Xc is determined by applying the data size Xt to an input of a trained long short-term memory neural network.

15. The non-transitory, computer-readable storage medium of claim 13, wherein the instructions are further configured for:
determining a resource availability A corresponding to availability of resources at the IoT device;
determining a resource availability B corresponding to availability of the resources at the edge device; and
using resource availabilities A and B in the minimization of Ttotal.

16. The non-transitory, computer-readable storage medium of claim 13, wherein
the space complexity data size Xc is determined by applying the data size Xt to an input of a trained long short-term memory neural network.

17. The non-transitory, computer-readable storage medium of claim 13, wherein the instructions are further configured for:
receiving a first set of processing results from the edge device at the IoT device;
executing data having data size [(1−K)*Xc] at the IoT device to produce a second set of processing results; and
aggregating the first and second set of processing results to generate a composite set of processing results.

18. The non-transitory, computer-readable storage medium of claim 17, wherein the instructions are further configured for:
using the composite set of processing results to execute a task at the IoT device.

* * * * *